(12) United States Patent
Nagasato et al.

(10) Patent No.: US 10,553,845 B2
(45) Date of Patent: Feb. 4, 2020

(54) BATTERY MODULE

(71) Applicant: Kabushiki Kaisha Toshiba, Tokyo (JP)

(72) Inventors: Makoto Nagasato, Tokyo (JP);
Tatsumi Matsuo, Tokyo (JP); Norio Shimizu, Osaka (JP); Masafumi Ebisawa, Tokyo (JP); Shinichiro Kosugi, Kanagawa (JP); Masahiro Sekino, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 250 days.

(21) Appl. No.: 15/457,497

(22) Filed: Mar. 13, 2017

(65) Prior Publication Data
US 2017/0187016 A1    Jun. 29, 2017

Related U.S. Application Data (63) Continuation of application No. PCT/JP2014/079704, filed on Nov. 10, 2014.

(51) Int. Cl.
*H01M 2/02*      (2006.01)
*H01M 2/10*      (2006.01)
*H01M 2/30*      (2006.01)

(52) U.S. Cl.
CPC ......... *H01M 2/1077* (2013.01); *H01M 2/027* (2013.01); *H01M 2/0257* (2013.01); *H01M 2/0277* (2013.01); *H01M 2/305* (2013.01); *H01M 2220/20* (2013.01)

(58) Field of Classification Search
CPC .. H01M 2/305; H01M 2/0277; H01M 2/0257; H01M 2/027
See application file for complete search history.

(56) References Cited

U.S. PATENT DOCUMENTS

| 2011/0076521 A1 | 3/2011 | Shimizu et al. |
| 2014/0069113 A1 | 3/2014 | Oh et al. |
| 2016/0164054 A1 | 6/2016 | Yamamoto et al. |

FOREIGN PATENT DOCUMENTS

| EP | 3032608 A1 | 6/2016 |
| JP | 57-151858 U | 9/1982 |
| JP | 61-161874 U | 10/1986 |
| JP | 3068733 U | 5/2000 |
| JP | 2012-038468 A | 2/2012 |
| JP | 2012-084486 A | 4/2012 |
| JP | 2013-530506 A | 7/2013 |

(Continued)

OTHER PUBLICATIONS

International Search Report and Written Opinion issued in related Application No. PCT/JP2014/079704, dated Feb. 10, 2015 (9 pages).

(Continued)

*Primary Examiner* — Ula C Ruddock
*Assistant Examiner* — Frank A Chernow
(74) *Attorney, Agent, or Firm* — Baker Botts L.L.P.

(57) ABSTRACT

According to one embodiment, a battery module includes a plurality of batteries and a module housing. The module housing accommodates the plurality of batteries. The module housing is configured by connecting a plurality of cases in a first direction. At least one of the plurality of cases includes a vacuum pad adsorption region which is on an end surface in a second direction intersecting the first direction and on which a vacuum pad is adsorbable.

12 Claims, 7 Drawing Sheets

(56) References Cited

FOREIGN PATENT DOCUMENTS

| JP | 2013-178965 A | 9/2013 |
| JP | 2013-196981 A | 9/2013 |
| JP | 2014053275 A | 3/2014 |
| JP | 2014-179215 A | 9/2014 |
| JP | 2015-035397 A | 2/2015 |
| WO | 2011/082226 A2 | 7/2011 |
| WO | 2012009145 A2 | 1/2012 |

OTHER PUBLICATIONS

Extended European Search Report issued in related EP application No. 14906032.9, dated Apr. 30, 2018 (6 pages).

BATTERY MODULE

CROSS-REFERENCE TO RELATED APPLICATION

This is a Continuation Application of International Application No. PCT/JP2014/079704, filed on Nov. 10, 2014, and the entire contents of the aforementioned application are incorporated herein by reference.

FIELD

Embodiments described herein relate generally to a battery module.

BACKGROUND

Secondary battery devices used in electric motor apparatuses such as hybrid vehicles or electric vehicles need to have high power and cope with frequent output changes. As such a secondary battery device, a battery module in which a plurality of batteries are accommodated in a housing can be used. The plurality of batteries are electrically connected in series or parallel in the housing depending on required power or capacity.

On the other hand, since the battery module contains the plurality of batteries, the weight is large. Thus, when the battery module is lifted to be installed in an electric motor apparatus by human power, the work takes time.

Therefore, using a machine such as manipulator for adsorbing and lifting the battery module using a vacuum pad can be considered. However, since a cover with low strength is attached to an upper surface in the battery module, there is a concern that the cover is damaged or disconnected due to the weight of the battery module itself when the cover is adsorbed by the vacuum pad and lifted. In addition, since holes that are used to fix the cover or the like are formed on the cover of the battery module, a region available for vacuum adsorption is small. Therefore, it is difficult to reliably transport the battery module through the adsorption using the vacuum pad.

DETAILED DESCRIPTION

According to one embodiment, a battery module includes a plurality of batteries and a module housing. The module housing accommodates the plurality of batteries. The module housing is configured by connecting a plurality of cases in a first direction. At least one of the plurality of cases includes a vacuum pad adsorption region which is on an end surface in a second direction intersecting the first direction and on which a vacuum pad is adsorbable.

Hereinafter, a battery module according to an embodiment will be described with reference to the drawings. The battery module of the embodiment is installed in an electric motor apparatus such as a hybrid vehicle or an electric vehicle.

Also, in the embodiment, descriptions will be based on the assumption that a horizontal direction in which a plurality of cases (a first case, a second case, and a cover) are connected is an X direction (a first case side is the −X direction and a cover side is the +X direction), a vertical direction perpendicular to the X direction is a Z direction (a vertically upward direction is the +Z direction and a vertically downward direction is the −Z direction), and a horizontal direction perpendicular to the X and Z directions is the Y direction (a side to which a second battery group is close is −Y direction and the opposite side is the +Y direction).

Figure 1:
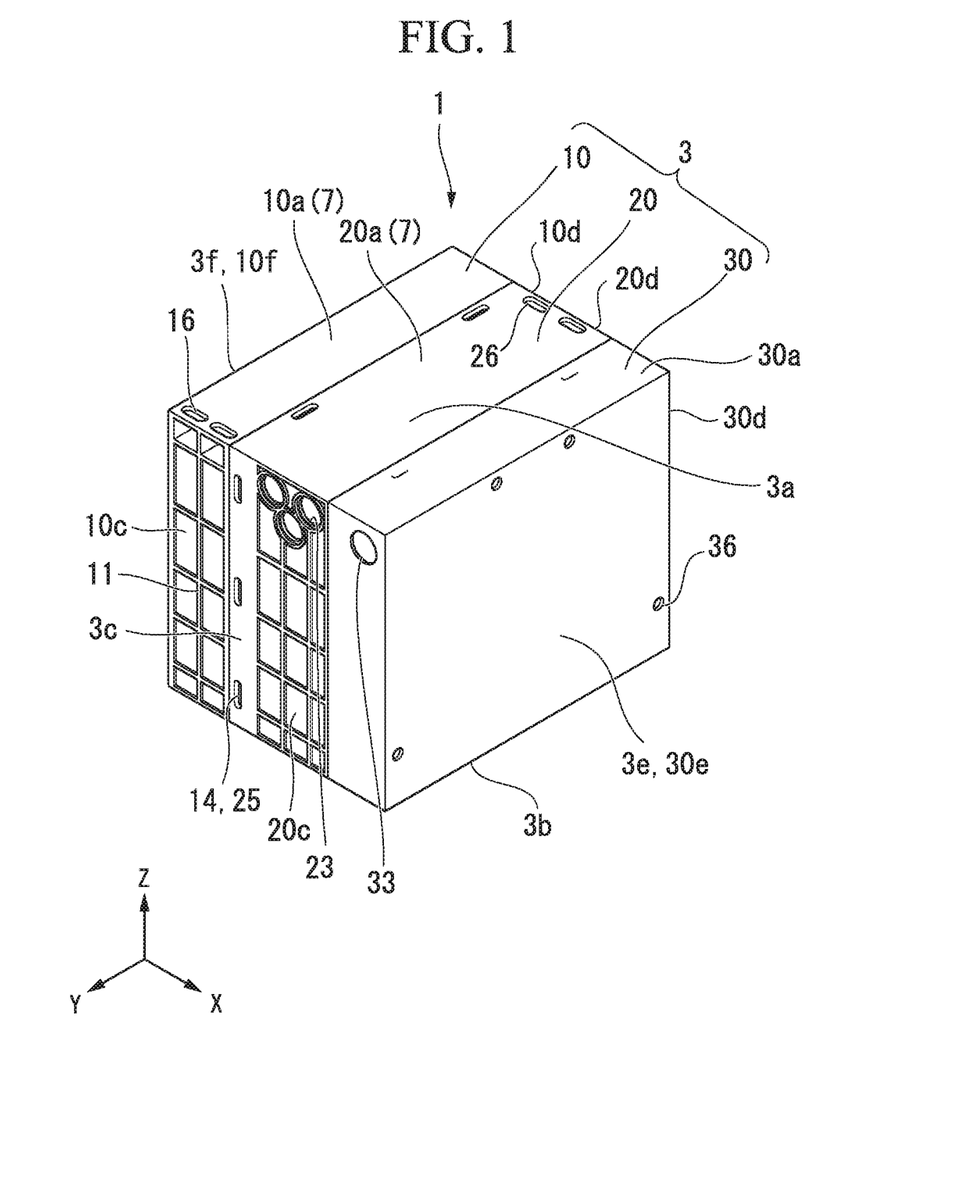
FIG. 1 is a perspective view showing an upper surface side of a battery module 1 according to an embodiment.
Figure 2:
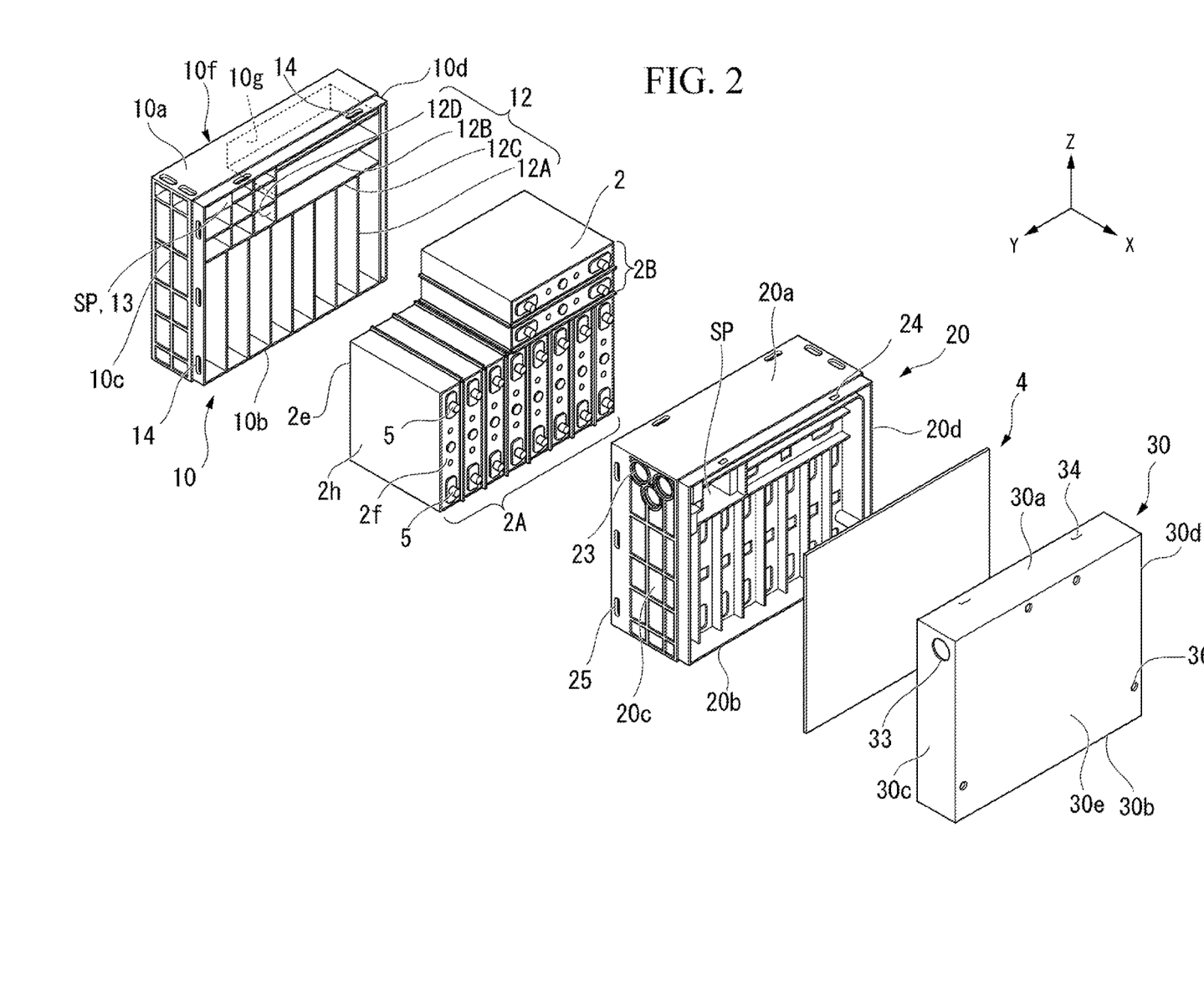
FIG. 2 is an exploded perspective view showing the battery module 1.
Figure 3A:
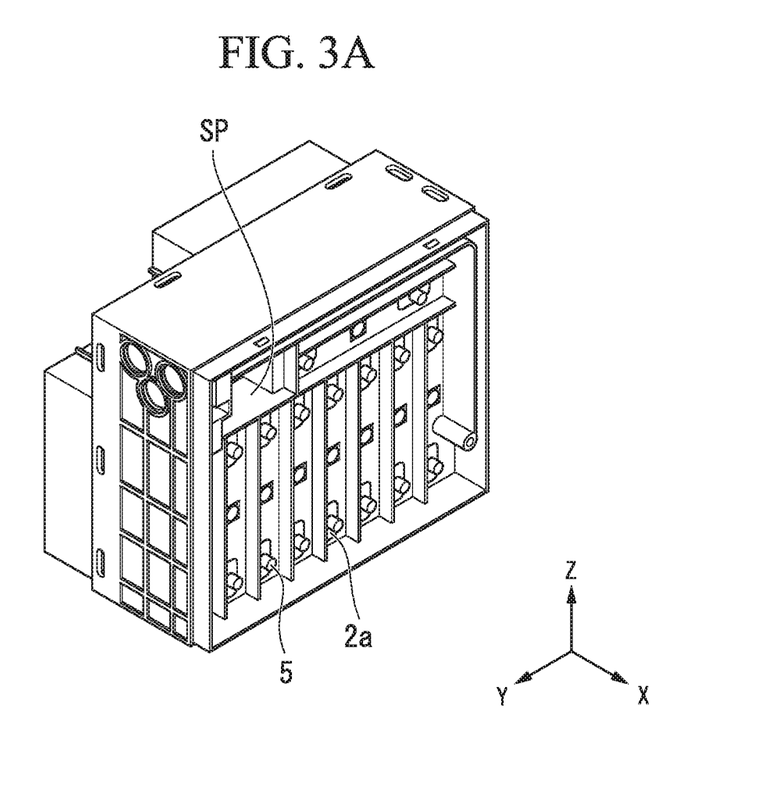
FIG. 3A is a perspective view showing a front side of a second case 20 in a state in which batteries are inserted.
Figure 3B:
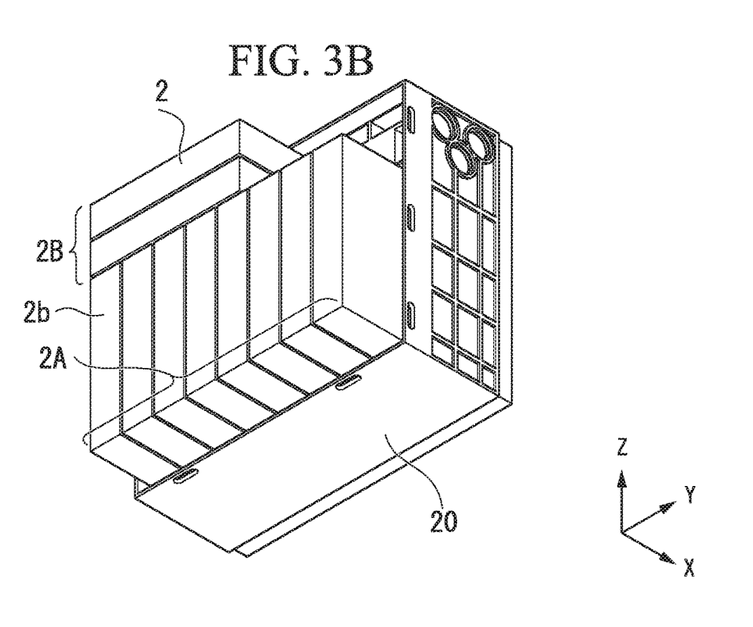
FIG. 3B is a perspective view showing a rear side of the second case 20 in a state in which batteries are inserted.
Figure 3C:
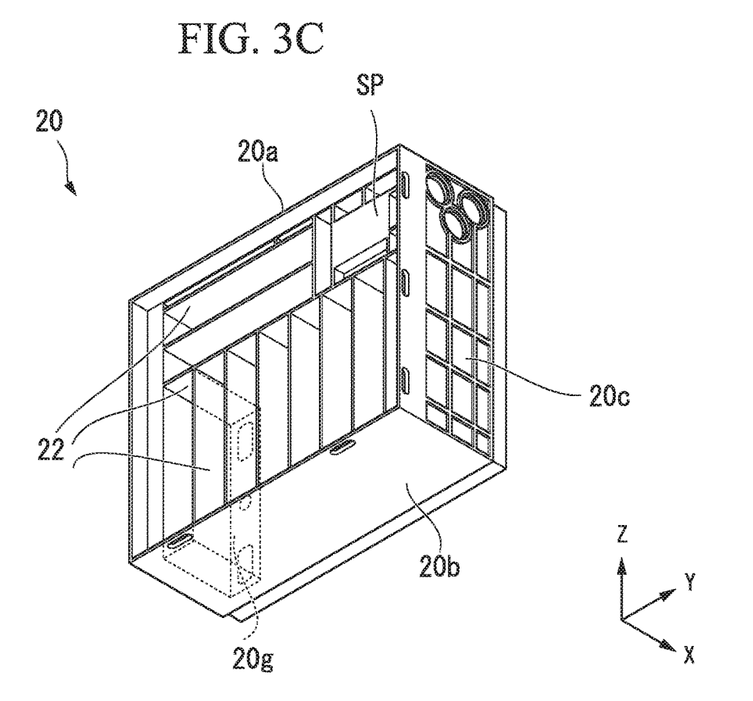
FIG. 3C is a perspective view showing a rear side of the second case 20.
Figure 4:
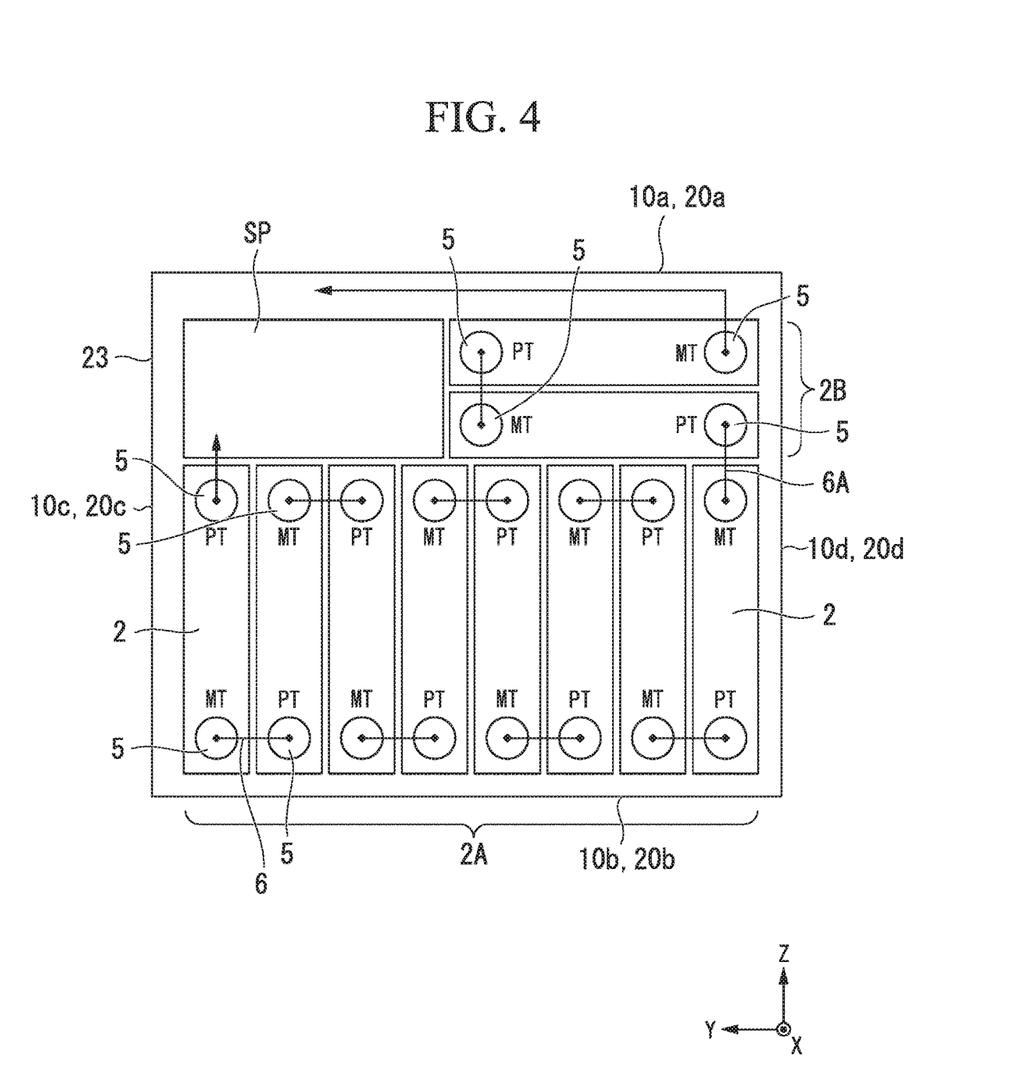
FIG. 4 is a schematic explanatory diagram of an arrangement of batteries 2 of the battery module 1.

FIG. 1 is a perspective view showing an upper surface side of a battery module 1 of the embodiment. FIG. 2 is an exploded perspective view showing the battery module 1. FIG. 3A is a perspective view showing a front side of a second case 20 in a state in which batteries are inserted, and FIG. 3B is a perspective view showing a rear side thereof. FIG. 3C is a perspective view showing a rear side of the second case 20. FIG. 4 is a schematic explanatory diagram of an arrangement of batteries 2 of the battery module 1.

As shown in FIGS. 1 and 2, a plurality of batteries 2, a control board 4, and a module housing 3 which accommodates the plurality of batteries 2 and the control board 4 are provided in the battery module 1 of the embodiment.

As the batteries 2, for example, sealed can type non-aqueous electrolyte secondary batteries such as lithium-ion secondary batteries are adopted. Each of the batteries 2 has a flat cuboid shape. The batteries 2 have positive electrode terminals 5 and negative electrode terminals 5 on a terminal surface 2a which is an end surface in the +X direction.

As shown in FIG. 2, the plurality of batteries 2 are constituted by a first battery group 2A and a second battery group 2B. The first battery group 2A and the second battery group 2B are disposed toward the terminal surface 2a on the +X direction side. The first battery group 2A is constituted by the plurality of batteries 2 (eight in the embodiment) stacked in the Y direction. The second battery group 2B is constituted by a plurality of batteries 2 (two in the embodiment) stacked in the Z direction.

Also, as shown in FIG. 4, when the plurality of batteries 2 are connected in series, a positive terminal (PT) and a negative terminal (MT) of adjacent batteries 2 are connected using a bus bar 6. The adjacent batteries 2 of the first battery group 2A are disposed to be inverted to each other by 180 degrees when viewed from the +X direction. Therefore, since the positive terminal (PT) and the negative terminal (MT) of the adjacent batteries 2 are disposed in parallel, a length of the bus bar 6 connecting them can be shortened. The same applies to the second battery group 2B.

Further, the second battery group 2B is disposed on the +Z side of the first battery group 2A in a state of being located in the −Y direction. Therefore, the negative terminal (MT) disposed in the +Z direction of the battery 2 disposed at an end portion in the −Y direction of the first battery group 2A and the positive terminal (PT) disposed in the −Y direction of the battery 2 disposed at an end portion in the −Z direction of the second battery group 2B are electrically connected by the bus bar 6A.

The control board 4 is electrically connected to the electrode terminals 5 of the batteries 2. As shown in FIG. 2, the control board 4 is disposed on the +X side of the second case 20 to be described later. The control board 4 has electronic components and circuit patterns (not shown) on at least one of the +X side and −X side. The control board 4 includes, as the electronic components, a switcher that is configured to switch a connection between the plurality of batteries 2 and a main circuit, and the like, for example. The control board 4 has a hole communicating with a screw hole (not shown) provided at the second case 20 and fixed to the second case 20 by a screw.

As shown in FIG. 2, in the module housing 3, the second battery group 2B overlaps the first battery group 2A in a state of being close to the −Y direction side. Therefore, a space SP is generated on the +Y direction side in the module housing 3. The space SP can be used as a junk box. A current protector, a heating protection device, or the like can be disposed in the space SP, for example. As the current protector and the heating protection device, for example, a fuse 50, a field-effect-transistor (FET) serving as a switcher, a contactor (relay), a circuit breaker, a bi-metal switch, a PTC (poly switch), and the like are adopted.

As shown in FIGS. 1 and 2, the module housing 3 is configured to include a first case 10, the second case 20, and a cover 30.

The first case 10 includes an end surface 30*f* whose normal direction is the −X direction and four outer periphery surfaces (an outer periphery surface 10*a* whose normal direction is the +Z direction, an outer periphery surface 10*b* whose normal direction is the −Z direction, an outer periphery surface 10*c* whose normal direction is the +Y direction, and an outer periphery surface 10*d* whose normal direction is the −Y direction). The second case 20 includes four outer periphery surfaces (an outer periphery surface 20*a* whose normal direction is the +Z direction, an outer periphery surface 20*b* whose normal direction is the −Z direction, an outer periphery surface 20*c* whose normal direction is the +Y direction, and an outer periphery surface 20*d* whose normal direction is the −Y direction). The cover includes four outer periphery surfaces (an outer periphery surface 30*a* whose normal direction is the +Z direction, an outer periphery surface 30*b* whose normal direction is the −Z direction, an outer periphery surface 30*c* whose normal direction is the +Y direction, and an outer periphery surface 30*d* whose normal direction is the −Y direction) and an end surface 30*e* whose normal direction is the +X direction.

An upper surface 3*a* (referred to as a "module upper surface") whose normal direction is the +Z direction in the battery module 1 and the module housing 3 (which may be referred to simply as a "module") is constituted by an outer periphery surface 10*a* of the first case 10, an outer periphery surface 20*a* of the second case 10, and an outer periphery surface 30*a* of the cover 30. The same applies to a lower surface 3*b* (referred to as a "module lower surface") whose normal direction is the −Z direction in the module. The same applies to side surfaces 3*c* and 3*d* (referred to as "module side surfaces") whose normal directions are ±Y directions in the module. A front surface 3*e* (referred to as a "module front surface") whose normal direction is the +X direction in the module is constituted by the end surface 30*e* of the cover 30, and a rear surface 3*f* (referred to as a "module rear surface") whose normal direction is the −X direction in the module is constituted by an end surface 10*f* of the first case 10.

As materials for each of the first case 10 and the second case 20, synthetic resins having an insulating property, for example, thermoplastic resins such as modified polyphenylene ether (PPE) or polycarbonates (PC), are used. The first case 10 and the second case 20 are formed by an injection molding method or the like.

As shown in FIG. 2, the first case 10 covers substantially half of the battery 2 from the side of a bottom surface 2*b* which is opposite to the terminal surface 2*a* of the battery 2. In the first case 10, an insulating wall 12 partitioning the plurality of batteries 2 is provided. The insulating wall 12 includes an inter-group wall 12C, a plurality of first group walls 12A, a second group wall 12B, and a second group end wall. The inter-group wall 12C is parallel to the XY plane and partitions the first group walls 12A and the second group wall 12B. The first group walls 12A are parallel to the XZ plane and partition the batteries 2 of the first battery group 2A. The second group wall 12B is parallel to the XY plane and partitions the batteries 2 of the second battery group 2B. A second group end wall 12D is parallel to the XZ plane and partitions the +Y direction side of the second battery group and the space SP.

In addition, the first case 10 has an insulating grid wall 13, in the space SP, constituted by a plurality of walls parallel to the XZ plane and a plurality of walls parallel to the XY plane.

The insulating wall 12 and the insulating grid wall 13 can be used as a positioner when the batteries 2 are accommodated and can also increase rigidity and strength of the first case 10.

Particularly, both end portions of the first group walls 12A in the Z direction parallel to the XZ plane of the first case 10 are connected to the inter-group wall 12C parallel to the XY plane and the outer periphery surface 10*b* of the first case. Also, both end portions of the second group end wall 12D in the Z direction are connected to the outer periphery surface 10*a* of the first case and the inter-group wall 12C parallel to the XY plane. Thus, the first group walls 12A and the inter-group wall 12C share a force applied to the battery module 1 in the Z direction.

As shown in FIGS. 3A and 3B, the second case 20 covers substantially half of the batteries 2 from the terminal surface 2*a* side of the batteries 2 so that the electrode terminals 5 and the near portion thereof are exposed. In the second case 20, as shown in FIG. 3C, an insulating wall 22 partitioning the plurality of batteries 2 is provided at a position corresponding to the insulating wall 12 of the first case. Similar to the insulating wall 12 of the first case 10, the insulating wall 22 can be used as a positioner when the batteries 2 are accommodated and also increase the rigidity and strength of the second case 20.

Also, as shown in FIG. 2, an adhesive (not shown) is applied on an inner bottom surface 10*g* of the first case 10 which comes into contact with a bottom surface 2*b* of the batteries 2 when the plurality of the batteries 2 are installed in the module housing 3. In addition, as shown in FIG. 3C, the adhesive (not shown) is also applied on an inner bottom surface 20*g* of the second case 20 which comes into contact with the terminal surface 2*a* of the batteries 2. Due to the adhesive, the plurality of batteries can be fixed to the first case 10 and the second case 20, and the connection between the first case 10 and the second case 20 can be strengthened with the batteries 2 interposed therebetween. Further, since the plurality of batteries 2, the first case 10, and the second case 20 are fixed by the adhesive, the rigidity and strength of the module housing 3 can be increased.

Also, when the adhesive is applied on the inner bottom surface 20g of the second case 20, it is preferable to apply the adhesive thereto so as to avoid positions corresponding to the electrode terminals 5 and the near portion thereof so that the adhesive does not adhere to the electrode terminals 5 of the batteries 2. For example, it is preferable that the adhesive be applied to a position corresponding to a region striding across the ridge line between the terminal surface 2a and the flat surface 2h of the batteries 2.

Also, as shown in FIG. 1, the first case 10 and the second case 20 are connected at a midpoint position between the terminal surface 2a of the batteries 2 and the bottom surface 2b in the X direction. Therefore, the rigidity and strength of the first case 10 and the second case 20 can be substantially the same and a problem of one case being damaged or the like can be prevented. In addition, since a depth of the first case 10 to the inner bottom surface 10g and a depth of the second case 20 to the inner bottom surface 20g in the X direction can be the same, the work of applying the adhesive becomes easy.

Also, the connection position between the first case 10 and the second case 20 is not limited as long as required rigidity and strength are provided and there is no problem in applying the adhesive.

In addition, it is preferable that there be no rib on the lower surface 3b (ground surface) and that the entire surface be flat. When the lower surface of the module has no rib and is flat, a heat dissipation property improves and thereby the plurality of batteries 2 can be efficiently cooled.

As shown in FIG. 2, the cover 30 covers and protects the control board 4 connected to the electrode terminal 5.

As a material of the cover 30, modified polyphenylene ether (PPE), polypropylene (PP), polyphenylene sulfide (PPS), or the like can be used, for example. The cover 30 is formed by an injection molding method or the like.

Also, harness drawing holes 23 and 33 are formed on a wall surface of the module housing which encloses the space SP. A harness which electrically connects the battery module 1 and the outside passes through the harness drawing holes 23 and 33. In addition, it is preferable that the harness drawing holes 23 and 33 be provided on the +Z direction side from the center of the module housing 3 in the Z direction and at a position close to the module upper surface 3a. In the embodiment, the harness drawing hole 23 is formed on the outer periphery surface 20c of the second case and the harness drawing hole 33 is formed on the outer periphery surface 30c of the cover 30.

Since the harness drawing holes 23 and 33 are provided closer to the +Z direction side than the center of the module housing 3 in the Z direction, the harness does not cause disturbance when the battery module 1 is installed in an electric motor apparatus. Also, since the harness drawing holes 23 and 33 are provided in the second case 20 and the cover 30, the harness connected to the control board 4 can be easily drawn out as compared with the case in which the harness drawing holes are provided in the first case 10. Further, since the harness drawing holes 23 and 33 are provided on the module side surface 3c, a vacuum pad adsorption region 7 to be described later can be formed more widely than when the harness drawing holes are provided on the module upper surface 3a.

Also, positions of the harness drawing holes are not limited to the above-described configuration as long as there is no other problem in taking out the harness, and they may be provided in the first case 10.

As shown in FIG. 1, the first case 10, the second case 20, and the cover 30 are connected to each other in the X direction in the module housing 3.

The first case 10 and the second case 20 are connected to each other by snap fitting. In this case, a plurality of engaging claws 14 of the first case 10 shown in FIG. 2 are engaged with a plurality of engaging holes 25 of the second case to connect the first case 10 and the second case 20.

When snap fitting is used to connect the first case 10 and the second case 20, it is possible to be easily connect them without using another member.

Also, as shown in FIG. 1, connection by snap fitting between engaging claws 24 and engagement recesses 34 is used in combination with fixing by a screw 36 for the connection of the second case 20 and the cover 30.

Generally, it is preferable that the cover 30 be easily detachable due to the high frequency of work of attaching and detaching. However, it is difficult to detach the cover when it is fixed only by snap fitting. In this regard, in this embodiment, the plurality of engaging claws 24 of the second case 10 are engaged with the plurality of engagement recesses 34 of the cover 30 to connect only one side of the cover by snap fitting and the other sides thereof are fixed by screws as shown in FIG. 2. Therefore, the detachment of the cover 30 can be easily performed by removing the screws.

Also, the entire case may be connected only by snap fitting in conditions other than that described above.

In addition, when the module housing 3 needs to be a waterproof structure, the inside of the module housing 3 may be sealed by applying an adhesive to a contact portion between an opening edge portion of the first case 10 and an opening edge portion of the second case 20, and a contact portion between the opening edge portion of the second case 20 and an opening edge portion of the cover 30.

As shown in FIG. 1, in the module housing 3 of the embodiment, the vacuum pad adsorption region 7 which can be adsorbed by a vacuum pad on the module upper surface 3a which is an end surface in the +Z direction intersecting the above-described connection direction is provided. A flat surface is formed on the vacuum pad adsorption region 7 and irregularities such as ribs or holes are not formed thereon. In the embodiment, a flat surface is formed on substantially the entire surface of the outer periphery surface 10a of the first case 10 and the outer periphery surface 20a of the second case 20 in the module upper surface 3a. Therefore, the vacuum pad adsorption region is formed on substantially the entire surface of the outer periphery surface 10a of the first case 10 and the outer periphery surface 20a of the second case 20 other than a position at which a hole is formed. The vacuum pad adsorption region 7 has a size that can be adsorbed by vacuum pads of a predetermined size and number.

Also, the vacuum pad adsorption region 7 may not be formed on substantially the entire surface of the outer periphery surfaces 10a and 20a. Only portions adsorbed by each vacuum pad may be dotted in an island shape.

Conventionally, the battery module 1 would be disposed so that a terminal surface 2f of the battery 2 is faced vertically upward. In this case, the end surface 30e of the cover would become the module upper surface, and the outer periphery surfaces of the first and second cases 10 and 20 would become the module side surface. Also, a rib would be formed on the entire outer periphery surfaces of the first and second cases to increase strength of the first and second cases.

However, when the end surface 30e of the cover becomes the module upper surface, it cannot be transported by vacuum adsorption due to insufficient strength of the cover. Also, when the outer periphery surfaces of the first and second cases 10 and 20 become the module upper surface, the vacuum adsorption is not possible due to interference by the rib.

In contrast, in the module housing 3 of the embodiment, the rib is not formed on the outer periphery surface 10a of the first case 10 and the outer periphery surface 20a of the second case 20 which correspond to the module upper surface 3a, and a flat surface of the vacuum pad adsorption region 7 is formed. Thus, the vacuum pad can adsorb the vacuum pad adsorption region 7. Further, the rigidity and strength of the first case 10 and the second case 20 increase due to the insulating walls 12 and 22 formed therein, the plurality of batteries fixed therein by an adhesive, or the like.

Accordingly, when the vacuum pad adsorption region 7 is adsorbed by the vacuum pad to lift the battery module, there is no concern about damage to the module housing 3 due to the weight of the battery module itself.

Also, the connection direction of the first case 10, the second case 20, and the cover 30 in the vacuum pad adsorption region 7 is different from the direction of gravity. Therefore, there is no concern of the connection of each case being disconnected due to the weight of the module even when the vacuum pad adsorption region 7 is adsorbed by the vacuum pad and lifted.

Therefore, since the vacuum pad adsorption region 7 is provided on the module upper surface 3a which is the end surface in the +Z direction intersecting the connection direction, the battery module 1 can be reliably transported using the vacuum pad. Therefore, the installation work can be performed simply in a short amount of time and the battery module 1 can be installed at an accurate position in an electric motor apparatus when the battery module 1 is installed in the electric motor apparatus.

Further, a size of the battery module does not become larger even when the vacuum pad adsorption region 7 is provided. Therefore, the battery module can be made small compared to the case in which a structure such as a hook is provided in the battery module 1.

Also, it is preferable that ribs 11 and 21 be provided on the outer periphery surfaces 10c and 10d of the first case and the outer periphery surfaces 20c and 20d of the second case, which are the module side surfaces 3c and 3d. The rigidity and strength of the battery module 1 can be enhanced by providing the ribs on the module side surfaces 3c and 3d, and a problem such as damage to the case can be prevented. In addition, from the same perspective, a rib may be provided on the end surface 10f of the first case 10 which is the module rear surface 3f.

In addition, it is preferable that an irregular portion such as a hole or a bolt not be formed at least on the vacuum pad adsorption region 7 in the module upper surface 3a. That is, it is preferable that at least the vacuum pad adsorption region 7 in the module upper surface 3a be a flat surface. Therefore, wider vacuum pad adsorption region 7 can be secured.

Also, it is preferable that flatness at least at the vacuum pad adsorption region 7 in the module upper surface 3a be less than or equal to 0.5 mm. In addition, it is preferable that surface roughness Ra of at least at the vacuum pad adsorption region 7 in the module upper surface 3a be less than or equal to 6.3 μm. Therefore, the vacuum pad adsorption region 7 is reliably adsorbed by the vacuum pad and the battery module 1 can be transported.

Next, a method by which the vacuum pad adsorbs the battery module 1 will be described with reference to FIGS. 5 and 6.

Figure 5A:
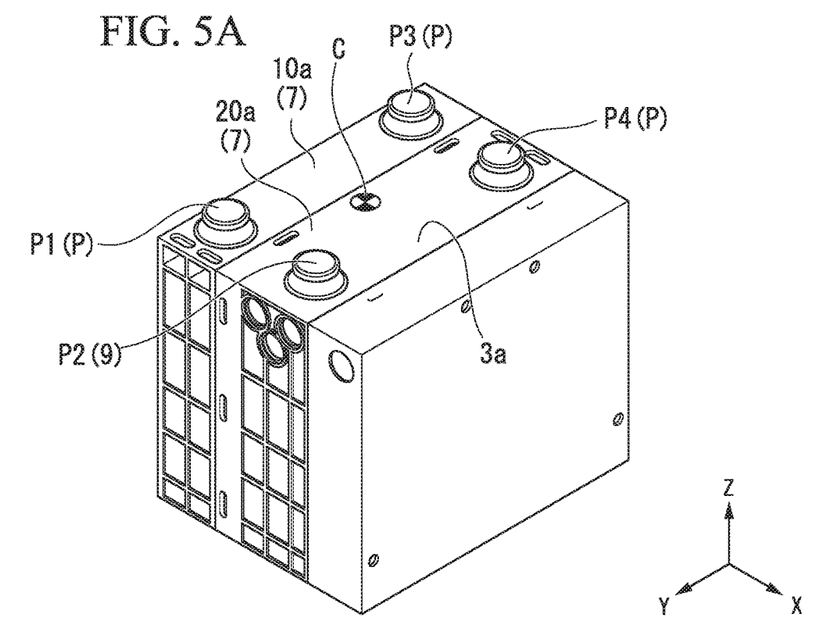
FIG. 5A is a perspective view showing a front side of the battery module 1 showing a state in which a vacuum pad adsorption region 7 is adsorbed by a vacuum pad.
Figure 5B:
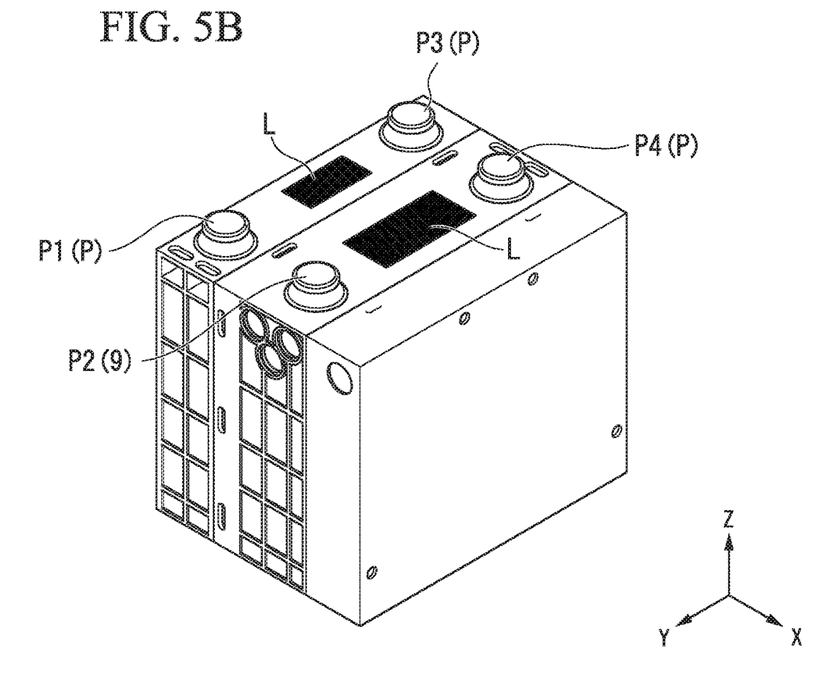
FIG. 5B is a perspective view showing a front side of the battery module 1 showing a state in which a label L is attached to a label attachment region.

FIGS. 5A and 5B is a perspective view showing a front side of the battery module 1 showing a state in which the vacuum pad adsorption region 7 is adsorbed by a vacuum pad. FIG. 6 is a plan view showing the battery module 1 showing a correlation between an adsorption position of a vacuum pad and a position of the center of gravity of the battery module 1.

Since the battery module 1 is heavy, it is preferable to use a plurality of the vacuum pads. Also, when a plurality of vacuum pads are used for adsorbing and lifting the battery module, it is preferable that the adsorption be performed in well-balanced manner. In the battery module of the embodiment, arbitrary positions can be adsorbed by the plurality of vacuum pads because a region set for the vacuum pad adsorption region 7 is wide.

When the plurality of vacuum pads are used, it is preferable that the vacuum pad adsorption region 7 be formed around a vertically upward position of the center of gravity C of the battery module 1. Therefore, the battery module 1 can be stably transported because occurrence of moment can be prevented when the battery module 1 is adsorbed and lifted.

Figure 6:
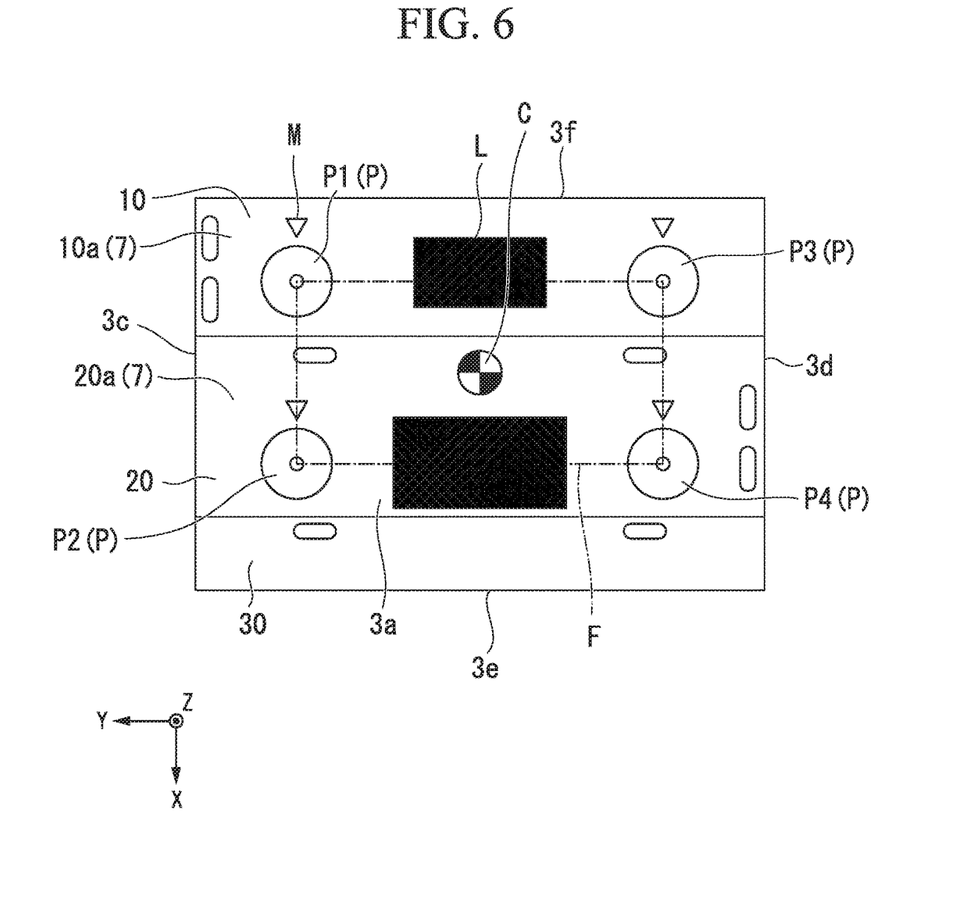
FIG. 6 is a plan view showing the battery module 1 showing a correlation between a vacuum pad adsorption region and a position of the center of gravity of the battery module 1.

When the vacuum pad adsorption region 7 is dotted in an island shape, it is particularly preferable that the vacuum pad adsorption region 7 be disposed so that a center of a figure F, as in FIGS. 5A and 6, is positioned vertically above the center of gravity C of the battery module 1. The figure F is the figure formed by connecting each center of the island shaped vacuum pad adsorption regions 7. Thus, by disposing the vacuum pad adsorption region 7 as described above, the moment is not generated when the battery module 1 is adsorbed by a vacuum pad P and lifted.

When the vacuum pad adsorption region 7 is formed on substantially the entire surface of the outer periphery surfaces 10a and 20a, the vacuum pad adsorption regions 7 may need to be adsorbed by the vacuum pad P so that a center of the figure formed by connecting each center of vacuum pads P1 to P4 is positioned vertically above the center of gravity C.

In this case, as shown in FIG. 6, a positioning marker M may be provided at or near an optimal adsorption position of the vacuum pad. The optimal adsorption position of the vacuum pad is easily recognized by providing the positioning marker. Also, when the adsorption is performed automatically using robots or the like, the positioning marker M can also be used as a marker for reading.

The batteries 2 of the battery module 1 are disposed in a space formed by the first case 10 and the second case 20. Therefore, as shown in FIG. 6, a position of the center of gravity C of the battery module 1 is closer to the first case side (−X direction) than the middle of the battery module 1 in the X direction. Accordingly, as shown in FIG. 6, the vacuum pads P1 to P4 are disposed on the outer periphery surface 10a of the first case 10 and the outer periphery surface 20a of the second case 20.

Also, the number, disposition, and shape of the vacuum pads that adsorb the vacuum pad adsorption regions 7 are not limited as long as the battery module 1 can be adsorbed and transported.

In addition, it is preferable that two or more systems be provided in an air intake system for the plurality of vacuum pads, although one system is sufficient. When two or more systems are provided in the air intake system for the plurality of vacuum pads, even when air intake of one air intake system is stopped during transportation, it is possible to prevent the battery module 1 from falling using another system.

For example, when the battery module 1 is adsorbed by the four vacuum pads P1 to P4 as shown in FIGS. 5A to 6, it is preferable that a first air intake system be used for P1 and P4 which are at symmetrical positions with respect to the center of gravity C and a second air intake system be used for P2 and P3 which are at symmetrical positions with respect to the center of gravity C. By configuring the air intake system as described above, even when one air intake system is stopped during transportation, the battery module 1 is not dropped because the two vacuum pads related to the other air intake system are positioned symmetrically with respect to the center of gravity C. Therefore, the battery module 1 can be stably transported.

Also, although the center of gravity C is shown in FIGS. 5A and 6 for explanation, the position of the center of gravity C is not necessarily indicated.

In FIG. 5B, a label attachment region L is formed on the module upper surface 3a outside of the vacuum pad adsorption region 7. In the battery module 1 of the embodiment, substantially the entire surface of the outer periphery surface 10a of the first case 10 and the outer periphery surface 20a of the second case 20 which are formed as a flat surface in the module upper surface can be used as the vacuum pad adsorption region 7. Accordingly, a region in which the vacuum pads are not adsorbed in the outer periphery surfaces 10a and 20a can also be used as the label attachment region L. Accordingly, in the battery module 1 of the embodiment, it is also possible to attach the label on the outer periphery surface 10a of the first case 10 and the outer periphery surface 20a of the second case 20.

Also, a position of the label attachment region L is not limited to the vicinity of the middle portion of the module upper surface 3a and may be provided near an edge of the module upper surface 3a as long as it can coexist with the vacuum pad adsorption region 7.

In the embodiment, the plurality of batteries 2 and the module housing 3 which accommodates the plurality of batteries 2 are provided in the battery module 1. The module housing 3 is configured by connecting the plurality of cases in a first direction (X), and the vacuum pad adsorption region 7 which can be adsorbed by the vacuum pad P on the end surface 3a of a second direction (Z) intersecting the first direction (X) is provided in at least one of the plurality of cases.

In the embodiment with the configuration described above, the vacuum pad can adsorb the vacuum pad adsorption region 7 of the battery module 1. In addition, since the direction in which the plurality of cases are connected is different from the direction of gravity, there is no concern of the cases being disconnected due to the weight of the battery module 1 when the vacuum pad adsorption region 7 is adsorbed by the vacuum pad and lifted. Therefore, the battery module 1 can be reliably transported by the adsorption using the vacuum pad.

Also, the batteries 2 have the terminal surface 2a in which the electrode terminal 5 is formed and the bottom surface 2b which is an opposite surface to the terminal surface 2a, and it is preferable that the module housing 3 includes, as the plurality of cases, the first case 10 for covering at least the bottom surface 2b of the plurality of batteries 2, the second case 20 for covering portions other than the electrode terminal 5 in the terminal surface 2a of the plurality of batteries 2, and the cover 30 for covering the control board connected to the electrode terminal 5 of the plurality of batteries 2. In addition, the vacuum pad adsorption region 7 is on the module upper surface 3a of the module housing 3 which is the surface perpendicular to the terminal surface 2a, and is preferably formed in at least one of the first case 10 and the second case 20.

With the configuration described above in the embodiment, the vacuum pad adsorption region 7 can be formed to be adsorbed by the vacuum pad even in the module housing 3 having a three-piece structure. In addition, since the direction in which the first case 10, the second case 20, and the cover 30 are connected is different from the direction of gravity, there is no concern of the cases being disconnected due to the weight of the battery module 1 when the vacuum pad adsorption region 7 is adsorbed by the vacuum pad and lifted. Therefore, the battery module 1 can be reliably transported by the adsorption using the vacuum pad.

Also, it is preferable that the insulating walls 12 and 22 be provided between the plurality of batteries 2 in a case having the vacuum pad adsorption region 7 among the first case 10 and the second case 20.

In the embodiment, since the insulating wall is provided inside the case adsorbed by the vacuum pad, the rigidity and strength of the case are enhanced. Therefore, there is no concern of the module housing 3 being damaged due to the weight of the battery module 1 itself when the vacuum pad adsorption region 7 is adsorbed by the vacuum pad and lifted. Therefore, the battery module 1 can be more reliably transported by the adsorption using the vacuum pad.

Also, it is preferable that the bottom surface 2b of the plurality of batteries 2 be bonded to the first case 10, and that the terminal surface 2a of the plurality of batteries 2 be bonded to the second case 20.

In the embodiment, since the plurality of batteries 2 are bonded to both the first case 10 and the second case 20, the rigidity and strength of the module housing 3 are further enhanced. Therefore, there is no concern of the module housing 3 being damaged due to the weight of the battery module 1 itself when the vacuum pad adsorption region 7 is adsorbed by the vacuum pad and lifted. Therefore, the battery module 1 can be more reliably transported by the adsorption using the vacuum pad.

Also, it is also preferable that the first case 10 and the second case 20 be connected at the midpoint position between the terminal surface 2a and the bottom surface 2b in the first direction (X).

With the configuration described above in the embodiment, the rigidity and strength of the first case 10 and the second case 20 can be substantially the same and a problem in which one case is damaged or the like can be prevented. In addition, since the depth of the first case 10 to the inner bottom surface 10g and the depth of the second case 20 to the inner bottom surface 20g can be the same, the work of applying the adhesive on each of the cases becomes easy.

Also, it is preferable that the label attachment region L be formed on the module upper surface 3a.

With the configuration described above in the embodiment, it is possible to secure the label attachment region L in a region which is not used for the vacuum pad adsorption region 7 in the module upper surface 3a.

Also, it is preferable that the first case 10, the second case 20, and the cover 30 be connected to each other by snap fitting.

In the embodiment, since the direction in which the cases are connected is different from the direction of gravity, there is no concern of disconnection even when the cases are connected by snap fitting. Also, when snap fitting is used for the connection, the cases can be easily connected without using another member.

Also, it is preferable that the cover 30 be fixed to the second case 20 using the screw 36.

With the configuration described above in the embodiment, the cover can be detached merely by detaching the screw.

Also, it is preferable that the flatness of the vacuum pad adsorption region 7 be less than or equal to 0.5 mm.

In the embodiment, a wider vacuum pad adsorption region 7 can be secured due to the configuration described above. Also, the vacuum pad adsorption region 7 is reliably adsorbed by the vacuum pad and the battery module 1 can be reliably transported.

Also, it is preferable that the surface roughness Ra of the vacuum pad adsorption region 7 be less than or equal to 6.3.

With the configuration described above in the embodiment, the vacuum pad adsorption region 7 is reliably adsorbed by the vacuum pad and the battery module 1 can be reliably transported.

Also, it is preferable that the vacuum pad adsorption region 7 be configured to have a size that the plurality of vacuum pads P can adsorb.

In the embodiment, since the vacuum pad adsorption region 7 is configured to be large, it can be adsorbed by the plurality of vacuum pads P. Therefore, the battery module 1 can be reliably transported in a more stable manner.

Also, it is preferable that the vacuum pad adsorption region 7 be formed around a position vertically above the center of gravity of the battery module 1.

With the configuration described above in the embodiment, since an occurrence of moment can be prevented when the battery module 1 is adsorbed and lifted, the battery module 1 can be stably transported.

Also, it is preferable that the harness drawing holes 23 and 33 in the module housing 3 be formed vertically above the middle of the module housing 3 in the second direction (Z).

With the configuration described above in the embodiment, there is no concern of the harness causing disturbance when the battery module 1 is installed in an electric motor apparatus.

In the embodiment described above, the three members of the first case 10, the second case 20, and the cover 30 are connected to form the module housing 3, but the invention is not limited thereto. The second case and the cover may be integrated to be used as a case and four or more case members may be connected.

Also, although the first battery group in which the plurality of batteries 2 are stacked in the Y direction and the second battery group stacked in the Z direction are configured in combination in the above-described embodiment, the total number of batteries, the number of stacked elements, and the disposition are not limited. They may be adequately modified according to required power output, capacity, a size, and a shape. Also, a shape of the module housing may be adequately modified according to the total number of batteries, the number of stacked elements, and the disposition.

Also, the insulating walls 12 and 22 are provided in both the first case 10 and the second case 20 in the above-described embodiment, but they are not limited thereto. The insulating wall may be provided only in any one in which the vacuum pad adsorption region 7 is formed, and the insulating wall may not be provided as long as required rigidity and strength are provided.

In addition, although only the case in which the module housing 3 is lifted by the vacuum pad is shown in the above-described embodiment, for example, two lifting portions 16 and 26 may be provided at the sides facing each other on the module upper side as shown in FIG. 1. When the lifting portions 16 and 26 are provided, transportation of the battery module by the adsorption using the vacuum pad and transportation of the battery module by human power can be used in combination.

According to at least one of the above-described embodiments, the vacuum pad adsorption region 7 which can be adsorbed by the vacuum pad (P) on the end surface 3a of the second direction (Z) intersecting the first direction (X) is provided in at least one of the cases. Therefore, since the direction in which the plurality of cases are connected is different from the direction of gravity, there is no concern of the cases being disconnected due to the weight of the battery module 1 when the vacuum pad adsorption region 7 is adsorbed by the vacuum pad and lifted. Therefore, the battery module 1 can be reliably transported by the adsorption using the vacuum pad.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A battery module comprising:
a plurality of batteries; each of which include a terminal surface on which an electrode terminal is formed and a bottom surface which is an opposite surface to the terminal surface; and
a module housing which accommodates the plurality of batteries, wherein
the module housing is configured by connecting a plurality of cases in a first direction the module housing includes, as the plurality of cases, a first case that covers at least the bottom surface of the plurality of batteries, a second case that covers a portion other than the electrode terminal in the terminal surface of the plurality of batteries, and a cover that covers a control board connected to the electrode terminal of the plurality of batteries,
at least one of the plurality of cases includes a vacuum pad adsorption region which is on an end surface in a second direction intersecting the first direction and on which a vacuum pad is adsorbable,
the vacuum pad adsorption region is on a module upper surface of the module housing which is a surface perpendicular to the terminal surface and is formed in at least one of the first case and the second case, and
an insulating wall is provided between each of the plurality of batteries in a case having the vacuum pad adsorption region among the first case and the second case.
2. The battery module according to claim 1, wherein the bottom surface of the plurality of batteries is bonded to the first case, and the terminal surface of the plurality of batteries is bonded to the second case.

3. The battery module according to claim 1, wherein the first case and the second case are connected at the midpoint position between the terminal surface and the bottom surface in the first direction.

4. The battery module according to claim 1, wherein the module upper surface has a label attachment region formed thereon.

5. The battery module according to claim 1, wherein the first case, the second case, and the cover are connected to each other by snap fitting.

6. The battery module according to claim 1, wherein the cover is fixed to the second case using a screw.

7. The battery module according to claim 1, wherein flatness of the vacuum pad adsorption region is less than or equal to 0.5 mm.

8. The battery module according to claim 1, wherein surface roughness Ra of the vacuum pad adsorption region is less than or equal to 6.3 µm.

9. The battery module according to claim 1, wherein the vacuum pad adsorption region is formed to have a size such that a plurality of vacuum pads are adsorbable thereon.

10. The battery module according to claim 1, wherein the vacuum pad adsorption region is formed around a position vertically above the center of gravity of the battery module.

11. The battery module according to claim 1, wherein the module housing has a harness drawing hole that is formed vertically above the middle of the module housing in the second direction.

12. The battery module according to claim 1, wherein
the plurality of batteries includes: a plurality of batteries stacked in the second direction; and a plurality of batteries stacked in a third direction perpendicular to the first direction and the second direction.

* * * * *